Patented Nov. 19, 1935

2,021,601

UNITED STATES PATENT OFFICE 2,021,601

PROCESS FOR OBTAINING PURE ALUMINIUM-ALKALI DOUBLE FLUORIDES

Friedrich Walter Hilscher, Wimpfen-on-the-Neckar, and Veit Schwemmer, Ottensoos, near Nuremberg, Germany, assignors to the firm of Saline Ludwigshalle, Wimpfen-on-the-Neckar, Germany, a corporation of Germany No Drawing. Application June 15, 1931, Serial No. 544,684. In Germany February 2, 1930

5 Claims. (Cl. 23—88)

The use of raw materials containing alumina and iron compounds, such as bauxite and the like as initial material for obtaining pure aluminium-alkali double fluoride compounds, such as cryolite, chiolite and the like was previously prevented by the content of silica, in so far as it was present, in these raw materials.

According to the properties of iron-alkali double fluorides disclosed in technical literature it was expected that by reason of their difficulty to dissolve that they would mix in a larger or smaller quantity with the aluminium-alkali double fluoride compounds to be obtained. It was, therefore, proposed to previously reduce the iron salt, present when there were large quantities of iron in the raw material, and to carry out the operation in a strong mineral acid solution. In order to obtain a cryolite free from iron from bauxite containing a very large quantity of iron, two methods were hitherto adopted. On the one hand it was endeavoured to precipitate the iron from the neutral aluminium fluoride solution produced from bauxite by treatment with pure alumina or with an excess of bauxite. On the other hand the bauxite before use was annealed in order to render the iron and the silica difficult to dissolve. In this connection, however, the solubility of the alumina was at the same time reduced. All these processes described in literature do not give a cryolite free from iron. Also processes according to which the iron is to be removed from the completed cryolite have not been found satisfactory in practice.

It has now been found in a surprising manner that contrary to all previous experiences it is possible in a simple and allowable manner to produce from raw materials containing alumina and iron compounds, such as bauxite and the like, aluminium-alkali double fluorides free from iron such as cryolite, chiolite and the like with a practically quantitative yield and in a form which satisfies all requirements of the art. According to the present invention this is effected, contrary to the methods of operation previously known, by first dissolving the raw materials in a quantity of hydrofluoric acid calculated on the aluminium-alkali double fluoride compound to be obtained. The iron passes into solution as a fluorine compound. The aluminium-iron fluoride solution is then treated with the calculated quantity of alkali salt, of which the acid forms a soluble iron salt, that is to say for example sodium chloride, sodium sulphate and the like, in solid or dissolved form. In this manner the aluminium fluoride present in the solution is precipitated as aluminium-alkali double fluoride, whilst the iron fluorine compound is also readily and practically quantitatively converted with the alkali salt. The aluminium-alkali double fluoride can then be separated easily and completely from the iron salt solution, for example by filtration, washing and the like.

When silica-containing raw materials are available the quantity of hydrofluoric acid which is added is preferably increased by an amount corresponding with the silica content of the raw material.

From the precipitated aluminium-iron fluoride solutions containing fluosilicic acid, which are also obtained when operating with commercial hydrofluoric acid containing fluosilicic acid, the silica can be removed in a surprisingly simple manner. This is effected by subjecting the aluminium-iron fluoride solutions containing fluosilicic acid, before their treatment to form aluminium-alkali double fluorides to a treatment in such a manner that the fluosilicic acid is precipitated by means of an alkali salt and then separated by the usual methods. That an alkali fluosilicate salt would separate in a pure condition was not expected in view of previous available technical literature. On the contrary it was anticipated that with the addition of alkali salt there would be formed aluminium-alkali double fluoride which is more difficult to dissolve. The effect of the above described method of operation was, therefore, the more surprising.

Examples 1. 100 kg. bauxite containing 54% $Al_2O_3$, 31% $Fe_2O_3$ and 0.9% $SiO_2$ are dissolved in 0.5 cubic metres of a hydrofluoric acid containing 24% HF and 1.5% $H_2SiF_6$ and the solution is stirred with 700 kg. of a 25% sodium chloride solution. The sodium-aluminium double fluoride is precipitated entirely free from iron in a quantity calculated on the basis of the aluminium and total fluorine.

2. 100 kg. bauxite containing 54% $Al_2O_3$, 22% $Fe_2O_3$ and 2% $SiO_2$ are dissolved in 0.5 cubic metre of a 24% hydrofluoric acid which in addition contains 12 kg. $H_2SiF_6$. The solution is treated with 17.5 kg. KCl, the filtrate of the $K_2SiF_6$-precipitate produces when stirred with 700 kg. of a 25% sodium chloride solution a sodium-aluminium double fluoride completely free from iron and silica. Instead of potassium chloride it is possible to use a corresponding quantity of sodium chloride.

3. 1 cubic metre of a hydrofluoric acid-bauxite solution, containing 108 kg. $Al_2O_3$, 50 kg. $Fe_2O_3$ as fluorides and also 77 kg. free HF and 6 kg. $H_2SiF_6$ is stirred with 430 kg. $Na_2SO_4$ dissolved in 1 cubic metre of water. The sodium aluminium double fluoride is precipitated entirely free from iron.

4. 100 kg. bauxite containing 54% $Al_2O_3$, 22% iron and 2% silica, is dissolved in 0.5 cubic metre of hydrofluoric acid which contains 120 kg. HF and 15 kg. $H_2SiF_6$. For the purpose of removing the silica from the aforesaid solution, a concentrated aqueous solution containing 11 kg. KCl is added to the bauxite solution. The silica precipitated as $K_2SiF_6$ is removed from the solution which is treated with 750 kg. of a 25% sodium chloride solution to precipitate the double fluoride of aluminium and sodium. By filtering the precipitate and washing the same free of iron chloride, a practically pure double fluoride of aluminium and sodium can be produced.

We claim:—

1. A direct process of producing pure aluminum alkali double fluorides directly from raw material containing alumina contaminated with iron and silicon which comprises treating raw material containing alumina contaminated with iron and silicon directly with hydrofluoric acid to dissolve aluminum, iron and silicon therefrom, adding to the solution thus obtained a limited amount of an alkali salt only sufficient to precipitate fluosilicic acid as an alkali metal fluosilicate without employing reducing means, separating the precipitated fluosilicate from the solution, and adding an alkali metal salt capable of forming a soluble iron salt and capable of forming an insoluble aluminum salt in an amount sufficient to precipitate an aluminum alkali double fluoride, and separating the precipitated double fluoride from the solution.

2. A direct process of producing pure artificial cryolite directly from bauxite contaminated with iron and silicon which comprises treating bauxite contaminated with iron and silicon with hydrofluoric acid in amounts sufficient to dissolve aluminum, iron, and silicon therefrom, adding to the resulting solution a limited amount of sodium chloride without employing reducing means to precipitate fluosilicic acid as sodium fluosilicate, separating the precipitated sodium silicate from the solution, adding to the solution an amount of sodium chloride sufficient to precipitate insoluble, artificial cryolite while forming a soluble iron salt, and separating the precipitated insoluble, artificial cryolite from the soluble iron salt contained in the solution.

3. A process of producing pure aluminum alkali double fluorides directly from solid water insoluble material containing alumina contaminated with iron and silica which comprises first preparing a solution of aluminum fluoride contaminated with iron and silica by directly treating the said material with a quantity of hydrofluoric acid containing as HF the amount of fluorine which is required for the formation of the desired double fluoride in addition to the amount required for transforming the silica present in fluosilicic acid, then adding to the solution thus obtained a limited amount of an alkali salt only sufficient to precipitate the fluosilicic acid formed as an alkali metal fluosilicate without employing reducing means, separating the precipitated fluosilicate from the solution, and adding an alkali salt of an acid capable of forming a soluble iron salt in an amount at least sufficient for the formation of the desired aluminum alkali double fluoride and finally separating the thus precipitated insoluble aluminum-alkali double fluoride from the soluble iron salt solution.

4. A process of producing pure aluminum alkali double fluorides directly from solid water insoluble material containing alumina contaminated with iron which comprises first preparing a solution of aluminum fluoride contaminated with iron by treating directly the said material with a quantity of hydrofluoric acid containing in addition to fluosilicic acid the amount of fluorine which is required for the formation of the desired double fluoride adding to the solution thus obtained a limited amount of an alkali salt only sufficient to precipitate the fluosilicic acid present as an alkali metal fluosilicate without employing reducing means, separating the precipitated fluosilicate from the solution, and adding an alkali salt of an acid capable of forming a soluble iron salt in an amount at least sufficient for the formation of the desired aluminum alkali double fluoride and separating the thus precipitated insoluble aluminum-alkali double fluoride from the soluble iron salt solution.

5. A direct process of producing pure artificial cryolite directly from bauxite contaminated with iron and silicon which comprises first preparing a solution of aluminum fluoride by treating directly the said bauxite with a quantity of hydrofluoric acid containing as HF the amount of fluorine which is required for the transformation of practically all the alumina present in cryolite in addition to the amount required for transforming the silica present in fluosilicic acid, then adding to the solution thus obtained without employing reducing means a limited amount of an alkali salt only sufficient to precipitate the fluosilicic acid formed as an alkali metal fluosilicate, separating the precipitated fluosilicate from the solution and adding to the resulting solution sodium chloride in a quantity at least sufficient to transform practically all the aluminum present in cryolite while forming soluble iron chloride and finally separating the precipitated insoluble artificial cryolite from the soluble iron chloride contained in the solution.

FRIEDRICH WALTER HILSCHER.
VEIT SCHWEMMER.